(12) United States Patent
Laufenberg et al.

(10) Patent No.: US 6,396,170 B1
(45) Date of Patent: May 28, 2002

(54) METHOD AND APPARATUS FOR COORDINATING UNINTERRUPTIBLE POWER SUPPLY MODULES TO PROVIDE SCALABLE, REDUNDANT POWER

(75) Inventors: Derek Laufenberg, Wauwatosa; Peter Jungwirth, Wisconsin Rapids; Joseph R. Wade, Mindoro, all of WI (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/537,421

(22) Filed: Mar. 29, 2000

(51) Int. Cl.[7] .................................................. H02J 1/04
(52) U.S. Cl. .......................... 307/64; 307/43; 307/52; 307/64; 307/82; 363/71; 363/142; 363/65
(58) Field of Search ............................. 307/26, 66, 65, 307/82, 43, 52, 64; 363/142, 71, 65

(56) References Cited

U.S. PATENT DOCUMENTS

| | | | |
|---|---|---|---|
| 4,356,403 A | | 10/1982 | Mohat .......................... 307/60 |
| 5,745,356 A | * | 4/1998 | Tassitino, Jr. et al. ........ 363/71 |
| 5,751,220 A | | 5/1998 | Ghaffari ................ 340/825.21 |
| 5,982,652 A | * | 11/1999 | Simonelli et al. ........... 363/142 |
| 6,166,455 A | * | 12/2000 | Li ................................ 307/43 |
| 6,166,934 A | * | 12/2000 | Kajouke et al. .............. 363/65 |

* cited by examiner

Primary Examiner—Josie Ballato
Assistant Examiner—Robert L. DeBeradinis
(74) Attorney, Agent, or Firm—Leydig, Voit & Mayer, Ltd.

(57) ABSTRACT

Presented is a modular uninterruptible power supply system utilizing common power modules, and providing redundant coordinated control thereof. The system and method of the instant invention provides identical control logic within each of the individual power modules, thus dispensing with the requirement for a separate control module to control and coordinate the operating modes and parameters of the UPS system. A system is presented whereby a virtual master is established through an arbitration scheme at initialization of the UPS system. The master then assigns a virtual vice master to provide the redundant back up control should the virtual master no longer be able to perform its functions. Nearly simultaneous control of operational mode and state change functions is accomplished through a coordinated communications system including a high-speed communications bus and digital control logic lines. Also provided is a mechanism for removal of the virtual master from its duties upon the detection of a problem that is not detected by the virtual master itself.

34 Claims, 5 Drawing Sheets

METHOD AND APPARATUS FOR COORDINATING UNINTERRUPTIBLE POWER SUPPLY MODULES TO PROVIDE SCALABLE, REDUNDANT POWER

FIELD OF THE INVENTION

This invention relates generally to the control of uninterruptible power supplies, and more particularly to the control and coordination of multiple power modules in a modular uninterruptible power supply.

BACKGROUND OF THE INVENTION

As more and more segments of the business environment enter the information age, more and more computers and computing power are required. As business move from the old to the new economy their reliance on the processing, transference, and storage of digital information is becoming a more and more critical aspect of their overall business strategy. While in the past, computer crashes were seen as a mere nuisance, the loss of computing power and business data may well devastate a business's ability to survive in today's new economy. As such, the need for reliable, uninterruptible electric power to maintain the operational status of the computing equipment and the integrity of the digital data continues to rise.

To meet these requirements, uninterruptible power supplies (UPS) have been developed. These UPSs utilize a bank of electric storage batteries and solid state conversion equipment in association with the utility line voltage to provide continuous electric power to a business's computer system in the event of a loss or deviation of power quality from the utility. The number of batteries contained within an UPS is dependent upon the business's length of time that it needs to operate in the event of a utility power system failure. Likewise, the number of power modules included in a modular UPS is dependent on the overall total system load required to be supplied thereby. In the past, uninterruptible power supplies were only available in discreet sizes. However, with the recognition of the various requirements from the multitude of businesses that require UPSs, the development of modular uninterruptible power supplies has provided a flexibility heretofore unknown. Now, a business's UPS power output may grow as its business needs by simply purchasing additional power modules and adding them to their existing modular UPS.

Unfortunately, the advent of the modular UPS has also introduced new and different challenges to the UPS designer. Specifically, the modular UPS must function as a single system regardless of the number of power modules that are added to or taken away from the UPS chassis. Output power quality, system display, and transitions between operating modes must all be coordinated between the multiple power modules that make up the business's UPS system.

One such modular UPS that provides coordinated operation is described in U.S. Pat. No. 5,982,652 to Simonelli, et al. for a METHOD AND APPARATUS FOR PROVIDING UNINTERRUPTIBLE POWER USING A POWER CONTROLLER AND A REDUNDANT POWER CONTROLLER. As described in this patent, the coordination and control of the multiple power modules contained in the modular UPS is accomplished through the provision of a main intelligence module (MIM) and a redundant intelligence module (RIM). The MIM and RIM have connections to each other and to the other modules to allow monitoring of operational conditions of the UPS system, including characteristics of the input and output power, and to provide phase synchronization, frequency regulation, and voltage regulation of the output power. In this system, the MIM functions as the primary controller within the UPS system and the RIM is a redundant controller that can assume control of the UPS system upon failure of the MIM or removal of the MIM from the UPS system. All of the power modules are substantially identical and perform the functions of an uninterruptible power supply under the control of the MIM or the RIM.

In the system of the Simonelli, et al. '652 reference, the main intelligence module (MIM) is the primary computer/controller in the UPS system. It acts as a central point in the system for collecting and communicating information about aspects of the power modules, battery modules, and the redundant intelligence module (RIM). The MIM contains a primary and a backup microprocessor for controlling and coordinating this operation. The redundant intelligence module (RIM) on the other hand is merely a backup version of the MIM, and provides redundancy in the event of a MIM failure, or while a MIM is being replaced. In this backup role, the RIM includes the same major systems as the MIM except for the main processor system, although some of the systems in the RIM are described as having less functionality than the corresponding systems in the MIM.

Unfortunately, such a control strategy greatly increase the overall cost of the modular UPS system by requiring that two separate additional modules be purchased and maintained in order to allow functionality of the UPS at all. In this way, in addition to the value providing power modules, battery modules, and battery charging modules, a user is forced to also purchase a separate main intelligence modules to control the other components in the system. Further, the user is forced to purchase a redundant intelligence module (RIM) whose only main purpose is to provide backup operation should the MIM fail. In other words, this module is totally superfluous to the actual operation and functionality of the uninterruptible power supply unless a failure of the MIM occurs.

In an economy that demands maximum efficiency from business resources, such a system that requires separate primary and redundant control modules simply cannot be justified. The unfeasibility of such a system may be clearly demonstrated in a situation where a business enterprise only needs a single power module to supply its uninterruptible power requirements. In such a situation, the Simonelli, et al., '652 system would require the business enterprise to purchase two control units, the MIM and the RIM, to control the single power module in its UPS. In such a situation it becomes clear that the provision of two control units to control a single power module is a luxury not many businesses would desire to acquire.

Therefore, there exists a need in the art for a modular uninterruptible power supply that has coordinated control of its constituent components and an acceptable level of redundancy without requiring the purchase of additional multiple control unit.

BRIEF SUMMARY OF THE INVENTION

An embodiment of the invention provides a method and apparatus for coordinating the control of uninterruptible power supply modules to provide scalable, redundant power. Each of the independent UPS power modules are designed to contain identical control logic, both hardware and software, so that only a single power module need be purchased to scale the UPS system based on the business enterprises power requirements. Each of these identical UPS power modules are connected to common communications, power, and logic buses within the UPS system. Under such a system, the multiple power modules act as a single UPS with all of the controls and actions taken by the individual power modules being coordinated through a single power module acting as the system's virtual master. Preferably, the master role is virtual because any of the power modules in the system contain all of the necessary control logic and software to assume the master role.

For the system of the invention to be fault tolerant it must be capable of withstanding a failure or removal of the power module that has assumed the master role. Preferably, this is accomplished by requiring another module to be prepared to provide backup to the master. In this role, designated vice-master, the power module provides the controlling signals to itself and the other power modules if and when the designated master fails. Under this system, the vice-master then promotes itself to master and assigns a new vice-master from one of the operational power modules in the system. Under the system of the invention, no additional main intelligence modules or redundant intelligence modules are required to perform this functionality. Coordination and redundancy are provided within the control of the individual power modules themselves.

A power up arbitration scheme is used to assign one of the power modules to the master's role. Preferably, the master then assigns a vice-master and assigns all other modules to act as peers. Peer modules simply follow the control commands of the master or vice-master depending on the operational status of these two units. Modules in the peer role are also drawn upon when a vice-master needs to be appointed to the master role upon detection of a problem with that unit. This hierarchy of roles provides the means to coordinate identical UPS modules into a larger UPS system without the need for additional special main and backup controllers. In the event that only a single power module is connected in the UPS system, it is quite capable of controlling itself in the role of the master, without a requirement for a vice-master or any peer modules to be connected. Under the system of the invention, there is no need for two separate control modules to control the one power module connected in the system.

Power module interconnection and coordination of control is accomplished using a common set of signals, collectively known as the redundancy management bus (RMB). The RMB of the invention includes a high-speed communication bus, a set of bi-directional logic lines, and one analog reference for each power phase of the UPS system. Each power module may drive any of the signals. It is the role of the power module that determines which signals are driven and which signals are merely monitored. The high-speed communication bus may take any one of a number of forms, including CAN, Ethernet, Serial 485, etc. In a preferred embodiment, a high-speed communication bus takes the form of a CAN bus due to CAN's inherit fault tolerance and noise immunity.

In accordance with the invention, the master is responsible for driving most of the signals on the RMB. The other power modules take direction from the master by acting on these signals. When the master power module fails or is removed from the UPS system, a master ok signal typically supplied by the master power module is no longer sent. This provides an indication that the vice-master power module should take over driving the analog output voltage target signal used by the power modules to create their output voltage waveforms. Since the role of the vice-master has previously been assigned, the remaining peers do not see a discontinuity in the output voltage target signal and therefore their inverter output waveforms are clean during this transition.

In a preferred embodiment of the invention, the microprocessor inside each of the power modules is connected to the RMB through an interface computer programmable logic device (CPLD). Preferably two digital signals from the processor are used to indicate the power module's role to the CPLD. The role logic is used to enable bus drivers for each role's group of output signals. The power module's particular role in a given UPS system determines the bus input/output direction for each communicated signal.

In a preferred embodiment of the invention, the microprocessor inside each of the power modules is connected to the RMB through an interface computer programmable logic device (CPLD). Preferably two digital signals from the processor are used to indicate the power module's role to the CPLD. The role logic is used to enable bus drivers for each role's group of output signals. The power module's particular role in a given UPS system determines the bus input/output direction for each communicated signal.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
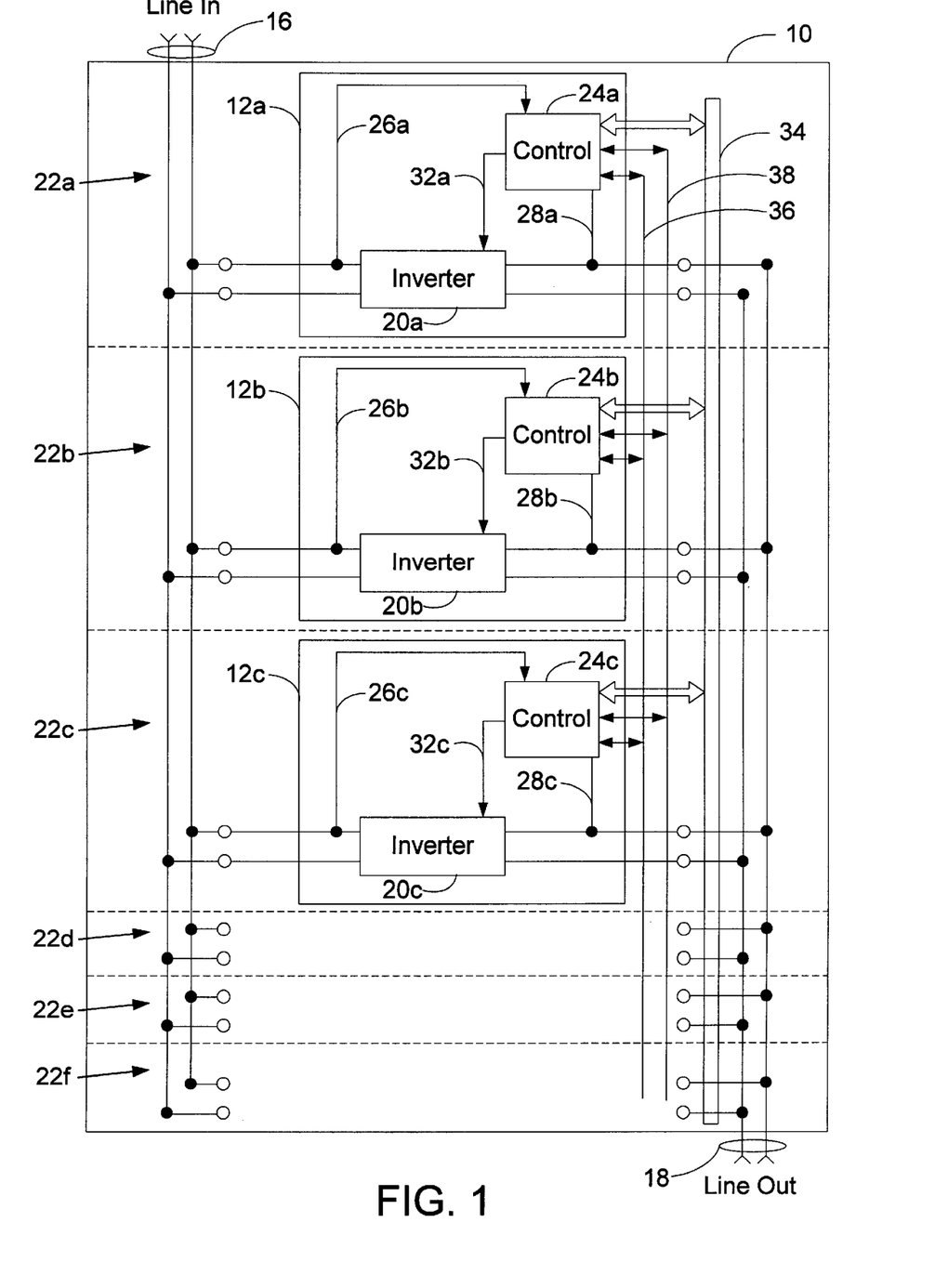
FIG. 1 is a system level single line diagram of a modular uninterruptible power supply system constructed in accordance with the teachings of the invention.

A preferred embodiment of the modular uninterruptible power supply (UPS) 10 constructed in accordance with the teachings of the invention is illustrated in single line block diagrammatic form in FIG. 1. As with typical modular UPS's, the modular UPS 10 of the invention includes multiple slots 22a–f into which various modular components may be placed. As illustrated in FIG. 1, modules 22a–c have installed therein power modules 12a–c constructed in accordance with the teachings of the invention. Slots 22*d–f* are illustrated in FIG. 1 as being empty, thus providing the ability to expand or vary the power generation capability of the modular UPS 10.

The AC input power from the utility is connected to the UPS 10 through lines 16, and the output of the UPS 10 is supplied to the utilization equipment through output lines 18. Preferably, each of the power modules 12*a–c* are identically constructed, and contain a power inverter 20*a–c* and a controller 24*a–c*. As will be recognized by those skilled in the art, the particular topology utilized for the construction of the inverter 20 may vary substantially based on system and performance level requirements. Preferably, the inverter 20 utilizes a double conversion H-bridge with its own internal bypass. The control for this inverter 20 is provided by the controller 24 through the control lines 32*a–c*. This control accomplishes both the proper operation of the power switches of the inverter to construct the output AC wave form, as well as the selection and designation of the proper operating mode for the inverter. These operating modes may include a bypass mode of operation for high efficiency or fault tolerance, and two modes of inverter operation. The first allowing the AC voltage from the utility to supply the inverter, while the second utilizing installed battery banks (not shown) to power the inverter.

As discussed above, the need for coordinated control between the individual power modules is paramount so that the UPS 10 may operate as an integrated unit. This unified and integrated control is accomplished by the separate control modules 24*a–c* in each of the individual, identical power modules 12*a–c*. The controllers 24*a–c* each receive operating parameters of its own power module, such as input power parameters via line 26*c* and output power parameters via line 28*c*. Additionally, the control modules communicate with one another via a high-speed communications bus 34. This communications bus may be constructed in accordance with any of a number of high-speed communication standards, including CAN, Ethernet, serial 485, etc. Preferably, this bus is implemented as a CAN bus in the UPS system 10 due to CAN's inherent fault tolerance and noise immunity.

In addition to the high-speed communication, and for reasons which will be discussed more fully below, the controllers 24*a–c* also communicate via a set of bi-directional logic lines 36. Further, communication between each of the controllers 24*a–c* to allow proper inverter coordination is accomplished via an analog reference 38 for each power phase of the UPS system 10. Collectively, this common set of signals is known as the redundancy management bus (RMB). Advantageously, each of the power modules 12*a–c* are capable of driving any of the signals contained on the RMB based upon an established role assumed by the power module 12*a–c* as will be discussed below. This role of the power module determines which signals are driven and which signals are monitored.

Figure 2:
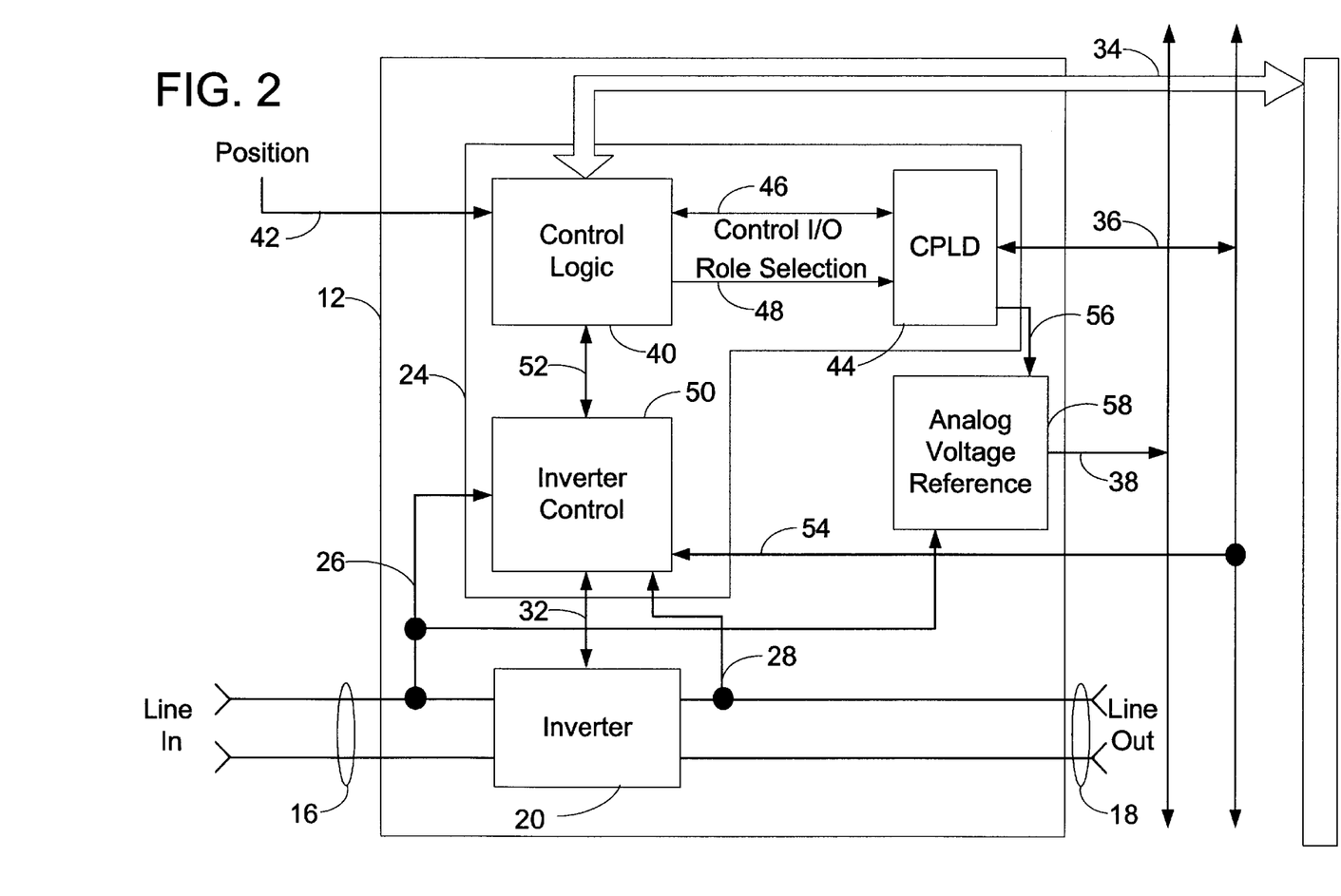
FIG. 2 is a detailed single line block diagram of the control structure of a power module constructed in accordance with the teachings of the invention.

FIG. 2 illustrates an individual power module 12 in greater detail. As may be seen from this detailed illustration, the controller 24 includes control logic 40 which is responsible for coordinating the integrated control of this particular power module 12 with the others included in the UPS system. The control logic 40 communicates via the bi-directional communication bus 34 to send and receive status information and nontime critical control signals. The control logic 40 may also receive a position signal 42 that designates in which slot of the UPS chassis the power module 12 is installed. This signal may also come from a user interface display controller that drives a user interface for the UPS, if one is included. The control logic 40 also communicates through a computer programmable logic device (CPLD) 44 over the set of bi-directional logic lines 36. The CPLD is utilized to properly configure the control signals via lines 36 in input or output mode for communication to the control logic 40 via lines 46 based on the role that the control logic 40 has assumed in the overall system. This role is communicated to the CPLD 44 via the role selection lines 48.

As will be discussed in greater detail below, the control logic 40 may determine that its power module 12 should be in the role of master, vice master, or peer. While various control signals may be utilized, a preferred embodiment of the invention contains control signals as indicated in Table 1. This table also indicates the direction of signal transfer depending on the role assumed by the control logic 40. The role selection signals 48 for this embodiment are indicated in Table 2. Table 3 defines a preferred pin out arrangement for the CPLD 44 to allow proper coordination of the input and output information conveyance based upon the role assumed by the particular power module 12.

TABLE 1

| RMB Signal | IO Direction on Master | IO Direction on Vice-Master | IO Direction on Peer | Description |
|---|---|---|---|---|
| MasterOK | Output | Input | Input | Indicates the master is functioning properly from its perspective. Its Watchdog and other checks are normal. When this signal is dropped, ViceMaster takes over driving the Output signals. |
| ViceMaster OK | Input | Output | Input | Indicates the vise-master is functioning properly from its perspective. |
| VMVoteOut | Input | Output | Input | Vice-Master asserts this line and requests that the current master be voted out of office. This is done when errors are seen by the Vice-Master in the cross channel data. |
| PeerVoteOut | Input | Input | Output | Any non-Master or non-Vice-Master asserts this line and requests that the current master is voted out of office. This is done when errors are seen by the Peer |

TABLE 1-continued

| RMB Signal | IO Direction on Master | IO Direction on Vice-Master | IO Direction on Peer | Description |
| --- | --- | --- | --- | --- |
| Start | Output | Input | Input | in the cross channel data. Controlled by the Master, this signal forces the previously requested action to begin on each of the functional peers. It is tied to an ISR on the power module. |
| Line Loss | Output | Input | Input | Signals an input line has been lost and the ups should go on inverter. |
| Verror | Analog output | Analog input (output on master failure) | Analog input | This is the output voltage target, which is set by the master and used by all power modules in the system. One for each line phase is needed. |
| CAN | Both | Both | Both | All modules may communicate on the CAN bus. |

TABLE 2

| Role/Enable Group | Drive Enable Equation | Description |
| --- | --- | --- |
| Master Output Enable (M_out-en) | = Ready & WDOK & !VoteOut & Master & !Vmaster | Acting as Master conditionally drives the Master's Output lines. All other lines are inputs to CPU. |
| Vice-Master Output Enable (VM_out_en) | = Ready & WDOK & VoteOut & !Master and Vmaster | Acting as ViceMaster - conditionally drives the ViceMaster's Output lines. All other lines are inputs to CPU. |
| Peer Output Enable (P_out_en) | = Ready & WDOK & !Master and !Vmaster | Acting as Peer - may drive the PeerVoteOut request. All other lines are input to CPU. |
| Startup | = Master & Vmaster | Startup condition - All outputs are high impedance. Ready latch state is set. On power-up this is the starting point. All lines are inputs to CPU. |
| Verror Drive | = M_out_en + (VM_out_en & !MasterOK) | Control's the driving of the analog Verror signal on the bus. |

TABLE 3

| Signal Name | CPLD Assignment/Equations | Description |
| --- | --- | --- |
| LocalOK | Pin on CPU side - I (input to CPLD) | Local Controller software believes it is functioning properly. Output from CPU. |
| Master | Pin on CPU side - I | Indicates if controller is in Master or Slave mode. Output from CPU. |
| Vmaster | Pin on CPU side - I | Indicates if controller is in Vice-Master or Slave mode. Output from CPU. |
| WDOK | Pin on CPU side - I | Local Watchdog monitor is OK and is being serviced. Output from CPU. |
| RdyClock | Input clock pin | Input clock for Ready state. |
| Bus Side | | |
| MasterOK_bp | = Master & !Vmaster & LocalOK & Ready OE = M_out_en | Pin on Bus side - I/O (both Input/Output) Bus drive or input based on Out enable. |

TABLE 3-continued

| Signal Name | CPLD Assignment/Equations | Description |
|---|---|---|
| ViceMasterOK_bp | = Vmaster & !Master & LocalOK & Ready OE = VM_out_en | Pin on Bus side - I/O Bus drive on input based on Out enable. |
| VMVoteOut_bp | = VMVoteOut_c & vmaster OE = VM_out_en | Pin on Bus side - I/O Bus drive or input based on Out enable. |
| PeerVoteOut_bp | = PeerVoteOut_c & peer OE = VM_out_en | Pin on Bus side - I/O Bus drive or input based on Out enable. |
| Start_bp | = Start_c OE = M_out_en | Pin on Bus side - I/O Bus drive on input based on Out enable. |
| LineLoss_bp | = LineLoss_c OE = M_out_en | Pin on Bus side - I/O Bus drive or input based on Out enable. |
| Verr_Drive | = M_out_en + (!MasterOK_b & VM_out_en) OE = M_out_en | Pin on bus side - O Enables analog drive. |
| CPU Side | | |
| MasterOK_c | = MasterOK_bp = M_out_en (if master) | Pin on CPU side - O Indicates Master is ok or not. |
| ViceMasterOK_c | = ViceMasterOK_bp = !M_out_en (if vice-master) | Pin on CPU side - O Indicates ViceMaster is ok or not. |
| VMVoteOut_c | = VMVoteOut_bp (if master) OE=!VM_out_en | Pin on CPU side - I/O I/O for CPU based on Out enable. |
| PeerVoteOut_c | = PeerVoteOut_bp (if master) OE=!P_out_en | Pin on CPU side - I/O I/O for CPU based on Out enable. |
| Start_c | = Start_bp (if !master) OE = !M_out_en | Pin on CPU side - I/O I/O for CPU based on Out enable. |
| LineLoss_c | = LineLoss_bp (if !master) OE = !M_out_en | Pin on CPU side - I/O I/O for CPU based on Out enable. |

As may further be seen in FIG. 2, the controller 24 also includes an inverter control section 50 which operates to control the inverter based upon inputs 52 from the control logic 40, input and output power monitoring signals 26, 28, as well as a voltage reference signal 54 from the analog reference line 38. This analog voltage reference line 38 may be driven by this particular power module 12 depending on the role assumed by the control logic 40. That is, if the control logic 40 has assumed the role of master, the CPLD 44 will enable 56 an analog voltage reference module 58 to generate and transmit the voltage reference signal on the analog voltage reference line 38. In the case where this power module 12 has assumed the role of master, its own analog voltage reference circuitry 58 will be driving the inverter control 50. For modules that have assumed roles other than the master, their analog voltage reference circuitry 58 will not be enabled via line 56 from the CPLD 44, and therefore the voltage reference signal 54 will be that determined by another power module.

Figure 3:
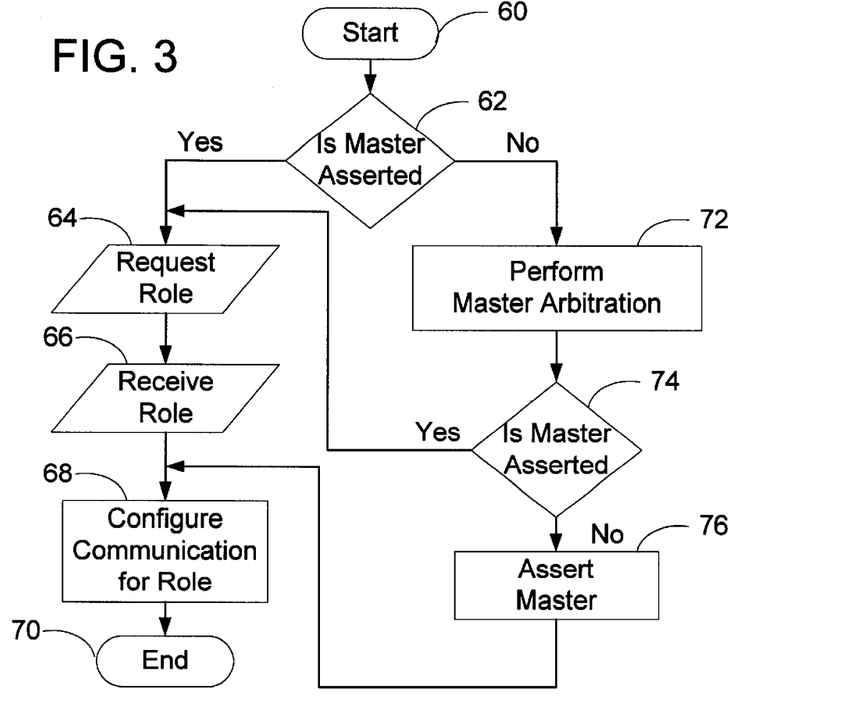
FIG. 3 is a control flow diagram illustrating the operating role determination process of the invention.

The determination of the proper role to be assumed by the control 40 of each individual power module 12 is determined initially at power up, as illustrated in flow diagrammatic form in FIG. 3. Once the control logic powers up 60 it checks the master okay signal to determine if any other units have asserted the master role 62. This is allowed at power up because the CPLD 44 (see FIG. 2) initially configures the control IO lines 46 in a receive mode until a role is established via the role selection lines 48. If another unit has already asserted the role of master, as may be the case if a power module is inserted to the UPS during operation, the control logic 40 will request a role 64 from the master. This role request signal is preferably transmitted via the high-speed bi-directional communications bus 34. Once the master has determined a role for this particular power module, it will receive this information 66 and thereafter properly configure its communications for the assigned role 68 before terminating this process 70. As discussed above, the configuration of the communications based on the role assignment allows the bi-directional signal lines to be properly interpreted as inputs or outputs in accordance with the direction information contained above in Table 1.

If, however, upon power up 60 it appears that no other power module has asserted the master role 62, this power module will begin to perform its master arbitration 72. This master arbitration is designed to bias a race between identical power modules so that only one winner attempts to assert the master role. Known methods for this arbitration include the generation of a random number within the power module. This random number is then used as a multiplier for a fixed time delay which must time out prior to the attempted assertion of the master role. In a preferred embodiment, this master arbitration utilizes position information communicated to the control logic 40 either from physically sensing the particular slot in which it is installed, or via a location signal transmitted from a common user interface and display controller if such is provided in the UPS 10.

Once the power module has completed its master arbitration 72, it checks to determine if any other control unit has already asserted the master role 74. If another unit has asserted the master role, this power module transmits a role request 64 to the master so that it may be assigned its proper role in the UPS configuration. Once it receives its role 66 it will then configure its communications for that role 68 before ending this process 70. If, however, no other power module has yet asserted the master role, the control logic 40 will assert that it is the master 76. Once this assertion has been made, the power module will then configure its communications for its role 68 before ending this process 70.

While in the role of master, that power module is responsible for controlling the state configuration of the entire UPS. When a state change is required, it is the responsibility of the master to coordinate this state change so that all power modules will perform the state change transitions at nearly the identical time. This coordination through the master unit is illustrated in the simplified flow diagram of FIG. 4. Once started 78 the master then determines that a configuration state change is needed 80. This determination may be based on a number of different factors, including user input, operational status of the power generation and distribution, fault detection, etc. Once the new configuration is determined by the master, it then transmits the new configuration information to the vice master and the peer power modules in the UPS system 82. This information is preferably transmitted via the high-speed communication bus 34 (see FIG. 1) to all of the other power modules. This information is used by the other power modules to prepare for the state change to minimize the system disturbance resulting therefrom.

Figure 4:
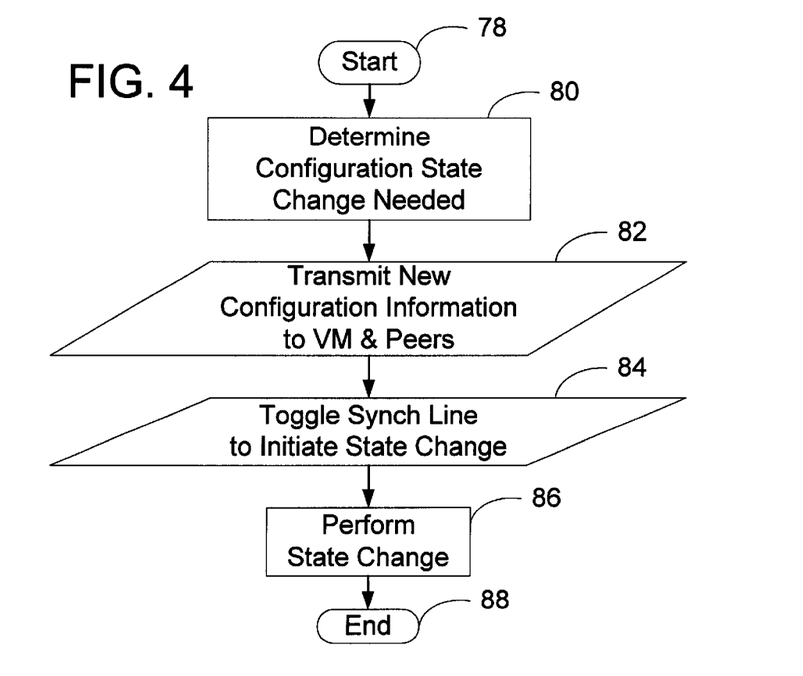
FIG. 4 is a control flow diagram illustrating master control of a configuration state change of the individual power modules in the UPS of FIG. 1.

Once the new configured information has been transmitted to all of the other power modules in the UPS system, the master then toggles 84 one of the control lines known as the synch line to initiate the state change. The sync line preferably initiates a high-level or non-maskable interrupt in controller 40 of each of the power modules in the UPS system, including itself. The high level interrupt is then processed and the units perform the state change 86 before ending the sequence 88. This control structure is utilized in a preferred embodiment to allow for nearly simultaneous transition between operating modes on each of the individual power modules in the system. Controlling these state changes requires tight timing on the execution skew between these distributed power modules, and the synch line and the high-speed communication bus are used in combination to accurately synchronize actions and events between the collection of the uninterruptible power supply modules.

While the high-speed communication bus provides an excellent means of triggering actions, microsecond synchronization of actions on multiple different processors is difficult because of the asynchronous nature of the communications. Communication latencies and interrupt delays limit the accuracy to only a few milliseconds. While such delays may be acceptable in systems utilizing ferroresonant transformer coupled outputs, such delays may be catastrophic in a transformerless system such as is used in a preferred embodiment of the invention. By utilizing the synch line and tying it to a high level interrupt for each of the controllers, the communication variability is removed. By processing the state change as a high level interrupt, the actions across the multiple controllers for each of the multiple power modules are all started at approximately the same time within the limits of the processor's high level interrupt handling. In a preferred embodiment of the invention, this is typically a few tenths of microseconds, and is in any event, much tighter than the communications bus would allow if it were used independently.

Figure 5:
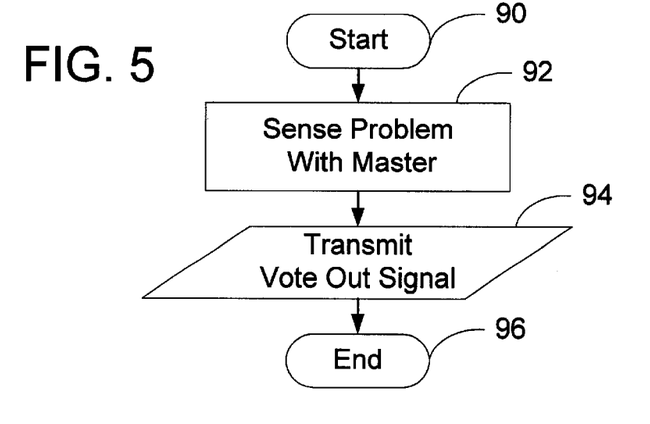
FIG. 5 is a control flow diagram illustrating a control methodology to allow power modules in the UPS system of FIG. 1 to vote out a master controller.

In addition to providing redundancy through the role assumption scheme discussed above, the system of the invention also includes a method for removing the current master in the event that other units sense a problem that the master cannot sense for itself. As indicated in the flow diagram of FIG. 5, once this process is started 90 and the unit senses any type of problem with the master 92 that qualifies as a removable problem, the unit transmit a vote out signal 94 to the master before ending 96. Qualifying problems are defined by the system requirements, and may include communication failures with the master, load sharing and balance problems due to a problem in the master's transmission of the $V_{error}$ signal, etc.

Figure 6:
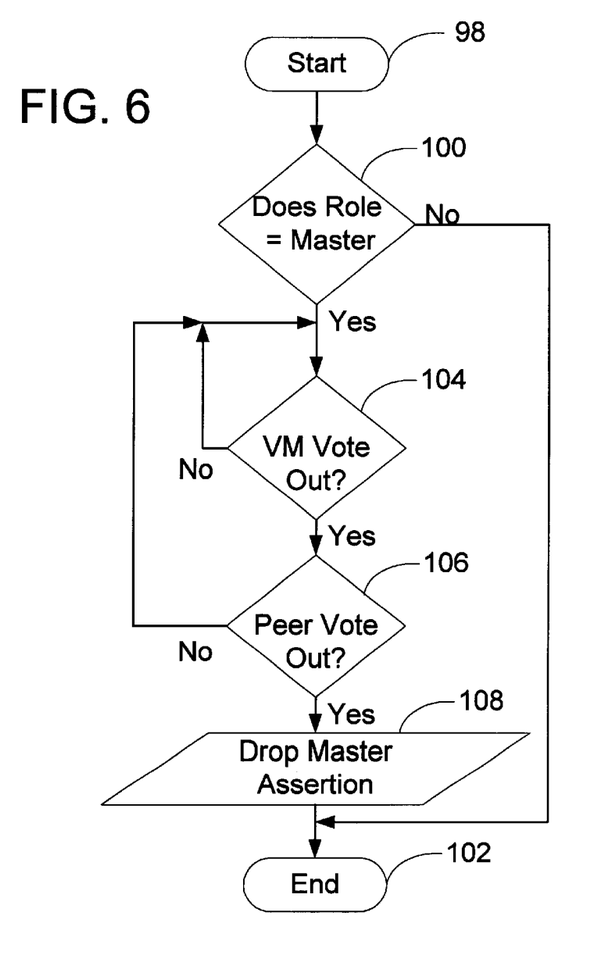
FIG. 6 is a control flow diagram illustrating the corresponding functional control logic within the virtual master in response to the vote out control flow of FIG. 5.

Within the master, as illustrated in the flow diagram of FIG. 6, once this process is started 98, the power module checks to determine that it is the master 100. If the power module is not in the role of master, the process ends 102. However, if the power module is in the role of master, it first checks to determine if it has received a vote out signal from its vice master 104. If it has received the vice master vote out signal 104 it then checks to determine if it has received a vote out signal from at least one peer 106 in the UPS system. If the master has not received a vote out signal from two units, one being the vice master and one being at least one of the peers, the master does not relinquish its role as master. If, however, the master has received a vote out signal from both the vice master and one of the peers, it then drops its master role assertion 108 before ending this process 102.

Figure 7:
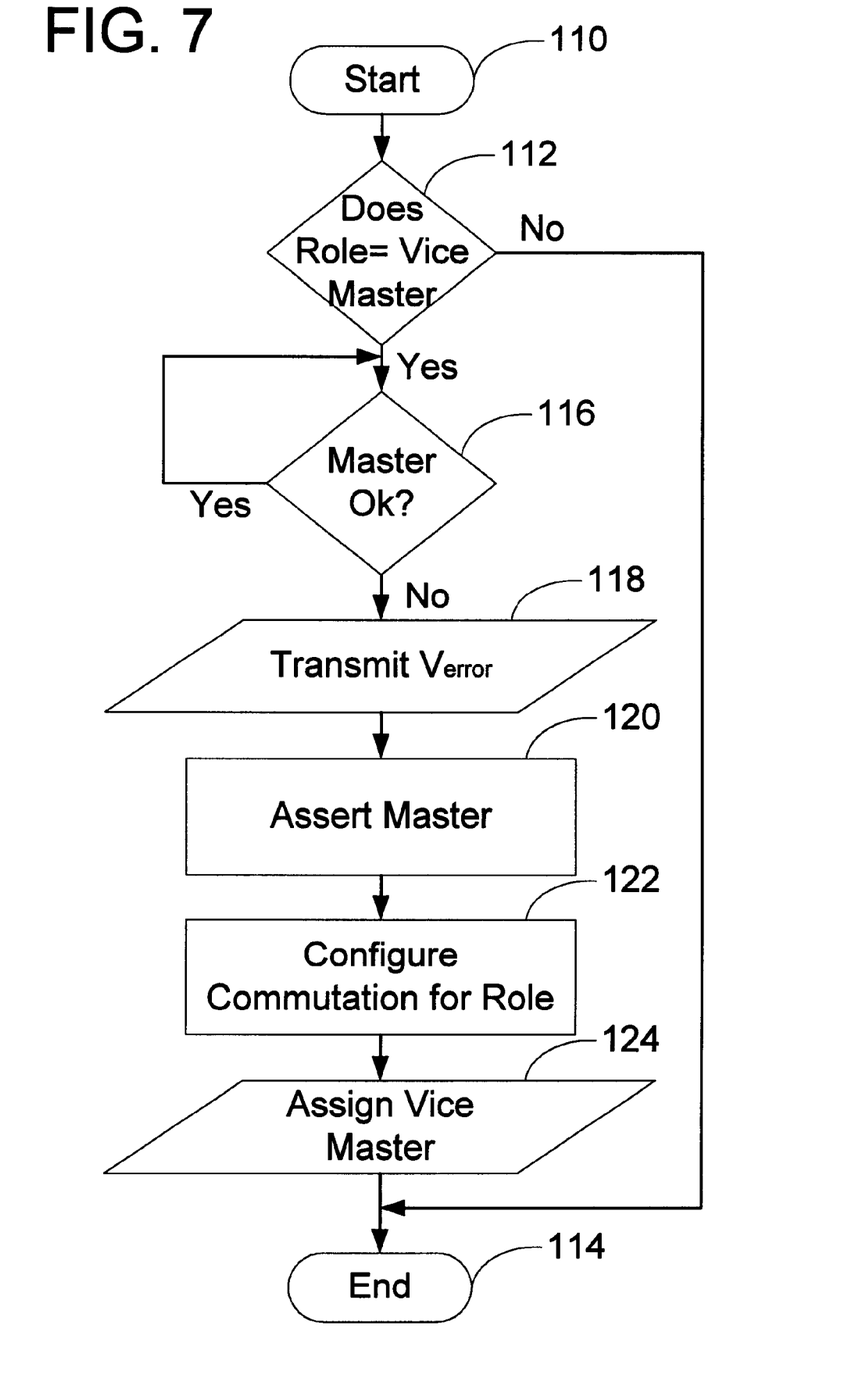
FIG. 7 is a control flow diagram illustrating the assumption of the virtual master role by a virtual vice master in accordance with the teachings of the invention.

Once the master has dropped its assertion of the master role, it is then the duty of the vice master to assume those responsibilities as illustrated in the flow diagram of FIG. 7. Upon initialization of this process 110 the power module checks to determine if its role has been assigned as the vice master 112. If not, this process ends 114 and the power module continues as a peer in the UPS system. However, for the power module that has assumed the role of vice master, it continuously checks to make sure that the master is still okay 116. As soon as it is determined that the master is no longer okay, the vice master then begins to transmit the $V_{error}$ signal 118 so that there is no, or only a minimal disturbance in this signal to the other power inverters. The vice master then asserts the master role 120 and reconfigures its communications for the master role 122.

Once this has been accomplished, the new master then chooses one of the peer modules as the vice master and transmits its new assignment to that power module 124 before ending this process 114. The assignment of the vice master may be accomplished through any number of control strategies from the available peers in the UPS system. Preferably, the vice master simply picks one of the peers based on a location priority and transmits the new role assignment thereto. Alternatively, the new master could transmit a master arbitration signal to each of the peers in the UPS system and assign the vice master based upon the winner of that arbitration.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A redundant modular uninterruptible power supply system, comprising:
   a chassis defining a plurality of slots adapted to accommodate a plurality of power modules therein, said chassis further providing input power lines and output power lines to each of said slots; and
   a plurality of power modules adapted to mount in said slots, said power modules including a power inverter coupled to said input power lines and to said output power lines, and a controller, said controller being operably coupled to said power inverter to control operation thereof; and
   wherein one of said controllers in one of said plurality of power modules asserts itself as virtual master to coordinate operation of all power modules; and
   wherein said virtual master appoints one of said controllers in one of said plurality of power modules as a vice master to provide redundancy of control in the event said virtual master fails.

2. The system of claim 1, wherein said chassis further provides a redundancy management bus (RMB) to each of said slots, said RMB comprising a communications bus, bi-directional logic lines, and an analog reference line.

3. The system of claim 2, wherein said power modules provide at least one phase of electric power, and wherein said RMB comprises an analog reference line for each at least one phase.

4. The system of claim 2, wherein one of said bi-directional logic lines is tied to a high level interrupt of said controller.

5. The system of claim 4, wherein said virtual master transmits a desired state change to said plurality of power modules via said communications bus to allow said plurality of power modules to prepare for said desired state change, and wherein said virtual master initiates said desired state change via one of said bi-directional logic lines, said plurality of power modules accomplishing said desired state change at a nearly identical time.

6. The system of claim 1, wherein one of said controllers in one of said plurality of power modules asserts itself as virtual master based on a position signal input.

7. The system of claim 1, wherein one of said controllers in one of said plurality of power modules asserts itself as virtual master upon performing a master arbitration when no other power module has asserted itself as virtual master.

8. The system of claim 1, wherein each of said plurality of power modules other than said virtual master transmits a vote out signal to said virtual master upon detection of a problem with said virtual master.

9. The system of claim 1, wherein said virtual master discontinues its assertion of said master role upon receipt of a vote out signal from said virtual vice master and at least one other of said plurality of power modules.

10. The system of claim 9, wherein said virtual vice master asserts itself as virtual master and appoints another of said plurality of power modules as virtual vice master upon said discontinuance of said virtual master's assertion of said master role.

11. The system of claim 1, wherein said virtual master transmits an analog voltage reference signal to said plurality of power modules for use by each power module to control an output voltage generated by its power inverter.

12. The system of claim 11, wherein said virtual vice master transmits said analog voltage reference signal to said plurality of power modules for use by each power module to control said output voltage generated by its power inverter upon loss of said virtual vice master.

13. The system of claim 12, wherein said virtual vice master asserts itself as virtual master and appoints a new virtual vice master from among said plurality of power modules.

14. In a redundant modular uninterruptible power supply system having a chassis defining a plurality of slots adapted to accommodate a plurality of power modules, each of the power modules including a power inverter and a controller therein, the controller operable to control output power generation from its power inverter, the slots providing coupling between the power modules via a redundancy management bus (RMB), the RMB including a communications bus, bi-directional logic lines, and an analog reference line, a method of redundantly coordinating output power generation from all of the power modules comprising the steps of:
   establishing from among the plurality of power modules a first power module to serve as a virtual master to coordinate operation of all of the power modules;
   appointing by the virtual master from among the remaining power modules a second power module to serve as a virtual vice master to provide redundant coordination of operation of all of the power modules in the event that the virtual master cannot coordinate operation.

15. The method of claim 14, wherein the step of establishing comprises the step of reading a position input from the chassis.

16. The method of claim 15, wherein the step of appointing further comprises the step of transmitting a peer role to other power modules that request a role.

17. The method of claim 16, further comprising the step of transferring the virtual master role to the power module appointed as the virtual vice master upon receipt by the virtual master of a vote out signal from the virtual vice master and at least one peer.

18. The method of claim 17, further comprising the step of appointing from among the peers a new virtual vice master.

19. The method of claim 14, wherein the step of establishing comprises the steps of:
   determining at power up that no other power module has asserted the virtual master role;
   performing a master arbitration;
   thereafter determining that no other power module has asserted the virtual master role; and
   asserting the virtual master role.

20. The method of claim 14, wherein the step of appointing comprises the steps of:
   receiving a role request signal from a first power module after asserting the virtual master role; and
   transmitting the virtual vice master role to the first power module.

21. The method of claim 14, further comprising the steps of:
   transmitting, by the virtual master, an analog reference signal on the analog reference line;
   controlling, by the controller within the other power modules, its power inverter in accordance with the analog reference signal on the analog reference line.

22. The method of claim 21, further comprising the steps of:
   sensing, by the virtual vice master, a loss of the virtual master; and
   transmitting, by the virtual vice master, the analog reference signal on the analog reference line to maintain coordinated operation of the power modules.

23. The method of claim 14, further comprising the steps of:
- transmitting, by the virtual master, a configuration state change message via the communications bus to the other power modules;
- preparing, by the other power modules, to accomplish the configuration state change;
- transmitting, by the virtual master, a high level interrupt via the bi-directional logic bus to initiate the configuration state change; and
- executing, by the other power modules, the configuration state change upon receipt of the high level interrupt.

24. A power module adapted for use in a redundant modular uninterruptible power supply (UPS) system having a chassis defining a plurality of slots adapted to accommodate a plurality of the power modules, the slots providing coupling between the power modules via a redundancy management bus (RMB), the RMB including a communications bus, a set of bi-directional logic lines, and an analog reference line, comprising:
- a power inverter;
- a controller operatively coupled to said power inverter for controlling an output power generation thereby; and
- wherein said controller includes control logic adapted to select and operate in one of a virtual master role, a virtual vice master role, and a peer role when installed in the UPS system.

25. The power module of claim 24, wherein said control logic is further adapted to control transitions from one role to another role during operation.

26. The power module of claim 24, wherein said control logic performs a master arbitration upon power up to determine which of said roles in which to operate.

27. The power module of claim 24, further comprising an analog voltage reference circuit having an output coupled to the analog reference line, said controller enabling said analog voltage reference circuit to produce an output voltage reference signal when operating in said virtual master role.

28. The power module of claim 24, wherein said controller utilizes a voltage reference signal from the analog reference line to control said output voltage generation when operating in either said virtual vice master role and said peer role.

29. The power module of claim 24, wherein said controller further includes a computer programmable logic device (CPLD) operable to communicate via the set of bi-directional logic lines, said CPLD designating individual logic lines in said set as input lines to be driven and as output lines to be monitored based on said role in which said power module is operating.

30. The power module of claim 29, wherein said CPLD changes said designation of at least one of said logic lines upon a change in operating roles.

31. A method of providing redundant, coordinated control of a modular uninterruptible power supply having multiple, identical power modules included therein, each of the power modules including a controller, comprising the steps of:
- performing master arbitration between said controllers of said multiple, identical power modules;
- asserting one of said controllers as a virtual master to coordinate operation of the modular uninterruptible power supply;
- assigning one of the remaining controllers as a vice master to provide redundancy of control in the event the virtual master fails.

32. The method of claim 2, wherein said step of performing master arbitration is performed at power up of the power module.

33. The method of claim 2, further comprising the steps of:
- sensing a problem with the virtual master;
- voting out the virtual master;
- promoting the virtual vice master to virtual master; and
- assigning a new virtual vice master.

34. The method of claim 31, further comprising the steps of:
- determining, within the virtual master, that a state change in the modular uninterruptible power supply is desired;
- communicating the state change to the power modules
- transmitting a high level interrupt to the power modules; and
- executing the state change upon receipt of the high level interrupt.

* * * * *